United States Patent [19]  [11] 4,020,709
Brocchi  [45] May 3, 1977

[54] DEVICE FOR ADJUSTING THE OPENING TRAVEL OF THE MOVABLE PLATE OF A MOLDING MACHINE FOR PLASTIC MATERIALS

[75] Inventor: Mario Brocchi, Lugano, Switzerland
[73] Assignee: F. Lli Sandretto S.a.s., Turin, Italy
[22] Filed: July 16, 1974
[21] Appl. No.: 489,006
[30] Foreign Application Priority Data
  Aug. 10, 1973 Switzerland .............. 11596/73
[52] U.S. Cl. .................. 74/89.15; 74/424.8 R
[51] Int. Cl.² ......................... F16H 27/02
[58] Field of Search ........... 74/520, 424.8 B, 89.15; 425/223

[56] References Cited

UNITED STATES PATENTS

| | | | |
|---|---|---|---|
| 2,092,563 | 9/1937 | Tucker | 74/424.8 B |
| 2,590,745 | 3/1952 | Wunsch | 74/424.8 B |
| 2,713,797 | 7/1955 | Roehri | 74/520 |
| 2,720,666 | 10/1955 | Kestell | 74/520 |
| 3,557,663 | 1/1971 | Florjancic | 425/DIG. 223 |

Primary Examiner—Samuel Scott
Assistant Examiner—Wesley S. Ratliff, Jr.
Attorney, Agent, or Firm—Ladas, Parry, Von Gehr, Goldsmith & Deschamps

[57] ABSTRACT

A device for adjusting the opening travel of a mold holder unit of a machine for molding plastic materials, comprising a movable plate which is arranged to support a portion of the mold and is actuated by at least one cylinder comprising a piston movable in a casing, said plate being movable, during the opening travel, from a first position, in which said mold is closed, to a second position in which said mold is open, is described. On the casing of the cylinder there being provided a member movable axially with respect to said casing and displaceable axially with respect to the casing by screw means in order to act as a stop for said piston during said opening travel.

3 Claims, 3 Drawing Figures

DEVICE FOR ADJUSTING THE OPENING TRAVEL OF THE MOVABLE PLATE OF A MOLDING MACHINE FOR PLASTIC MATERIALS

CROSS REFERENCE TO RELATED APPLICATION

Applicant claims priority from corresponding Swiss Patent Application Ser. No. 11596/73 filed Aug. 10, 1973.

BACKGROUND OF THE INVENTION

This invention relates to a device for adjusting the opening travel of the movable plate of a moulding machine for plastic materials, by means of which it is possible to stop said plate in a pre-established position during said opening travel.

As it is well-known, the moulding presses or moulding machines for plastic materials, in particular thermoplastic materials, are provided with a mould holder unit comprising a pair of plates between which is positioned the mould and one of which is arranged to move axially with respect to the other, departing from or approaching said other plate in order to allow, respectively, the opening or the closure of the mould.

Normally, said movable plate is actuated by a fluid operated cylinder controlling a kinematic toggle mechanism, which is apt to cause said plate to move from a first to a second position, in which positions said plate is located, respectively, at the minimal and the maximal distance from said other plate.

The movable plate reaches the first of said two positions when the kinematic toggle mechanism is in its extended position, i.e. in a position in which some of the members which constitute said mechanism arrange themselves in such a way as to originate substantially a chain of support bars which are able to support the high injection pressures which discharge themselves onto the movable plate.

The travel of this plate, which is necessary for moving it from said first to said second position, must be adjustable in accordance with the characteristics and dimensions of the mould mounted on the press, so that the above-mentioned second position must be variable to conform with the different conditions of operation of the machine.

In the prior art machines, the adjustment of the travel of said plate, and consequently the fixing of said second position, is obtained by acting on the hydraulic device which controls the fluid operated cylinder actuating the kinematic toggle device; in fact, by discontinuing the feed of the working fluid to the fluid operated cylinder during the opening travel of the movable plate it is possible to stop the latter in a pre-established position. However, the adjustment of the end of travel position of the movable plate, effected in the way described above, presents some disadvantages. First of all, said position cannot be fixed very precisely, nor is it possible to stop said plate always in the same position during each opening cycle of the machine. Furthermore, the stop of the movable plate thus obtained is not positive, that is to say that if external forces of a high value act on the plate, said plate does not maintain its position.

Also known are manually adjustable screw devices for adjusting the travel of such plates. Such devices comprise substantially a threaded stem which is screwed in a nut rigidly connected to the frame of the machine and whose one end passes through a wall of the casing of the fluid operated cylinder to act as a stop for the piston of said cylinder; the position in which said piston and, consequently, the movable plate are stopped can be varied by turning the threaded stem.

The devices of this type present the disadvantage of having a very high axial dimension; in fact, said stem, which protrudes axially from the end of the fluid operated cylinder, being provided with a smooth cylindrical portion which is apt to traverse the end wall of the casing of said cylinder, has a length which is at least twice as long as the length of the travel of the piston which it has to stop.

SUMMARY OF THE INVENTION

The object of this invention is to provide a device for adjusting the opening travel of a mould holder unit of a machine for moulding plastic materials, which will allow to eliminate the disadvantages described above.

The device according to the invention, comprises a movable plate which is arranged to support a portion of the mould, said plate being movable, during the opening travel, from a first position, in which said mould is closed, to a second position in which said mould is open, a cylinder comprising a piston movable in a casing and apt to actuate said movable plate, a member movable axially in said casing, and displaceable axially with respect to the casing by screw means in order to act as a stop for said piston during said opening travel, a threaded stem rotatable and fixed axially with respect to said casing, a screw nut rigidly connected to said movable member, and means arranged to prevent said movable member from rotating with respect to said casing, so that in consequence of the rotation of said threaded stem only an axial translation of said movable member takes place.

BRIEF DESCRIPTION OF THE DRAWINGS:

For a better understanding of the present invention, a particular embodiment of the invention will now be described by way of example with reference to the accompanying drawings, in which.

Figure 2:
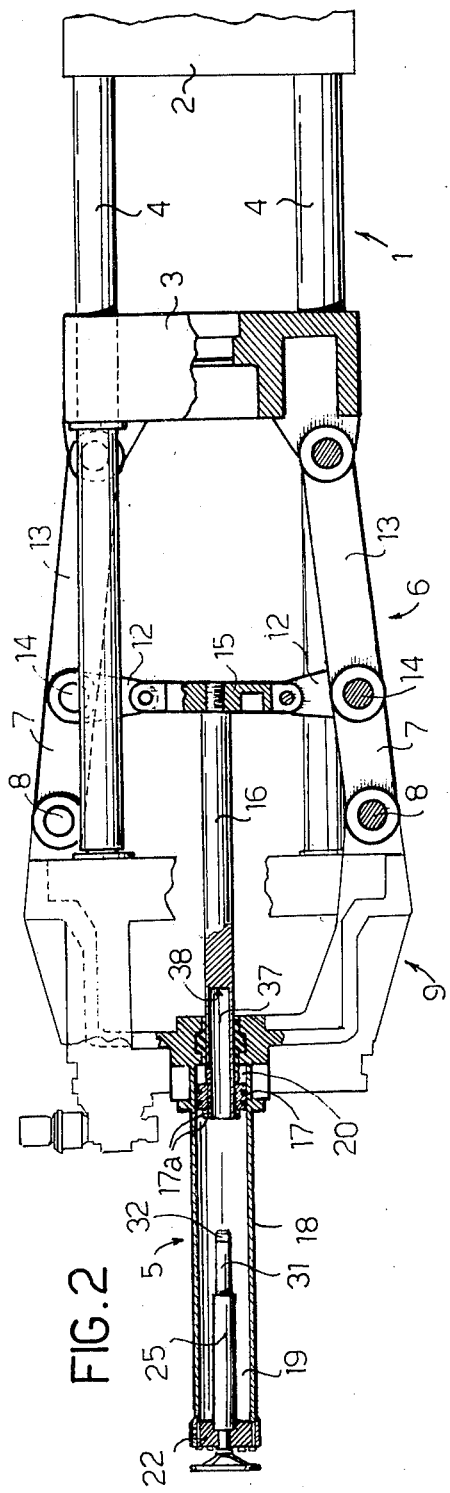
FIG. 2 is a partially sectional side elevation of a mould holder unit of a machine for injection moulding of thermoplastic materials, provided with the device according to the invention, the movable plate of such moulding press being shown in the first position described above.
Figure 3:
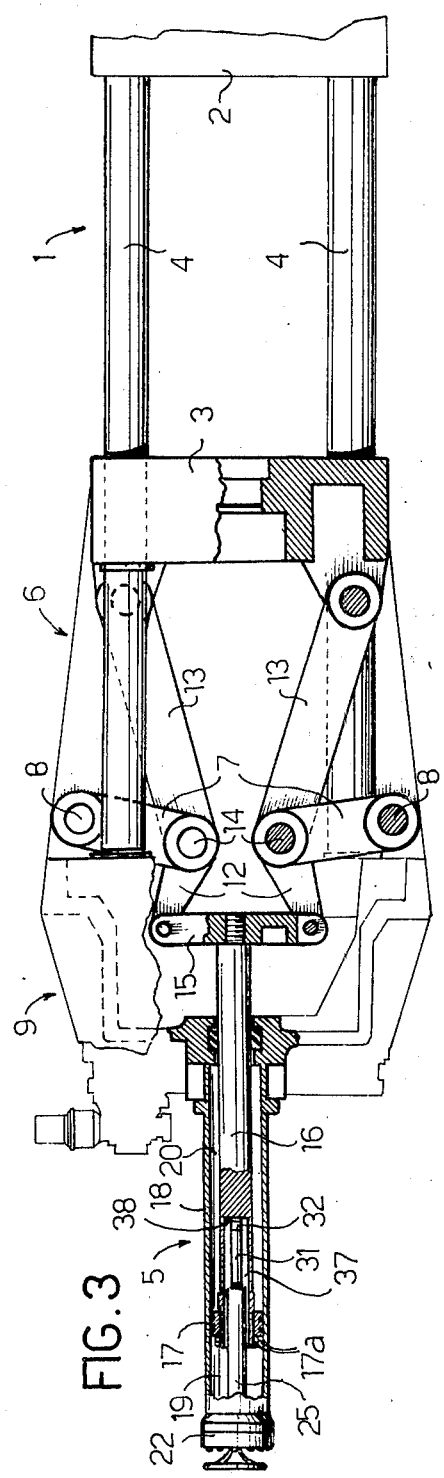
FIG. 3 is a side elevational view similar to that shown in FIG. 2, in which the movable plate of the moulding press is shown in the second position described above, in which said plate has been stopped by the device according to the invention.

Referring first to FIGS. 2 and 3, a machine for moulding thermoplastic materials is provided with a mould holder unit, indicated generally by reference numeral 1, comprising a stationary plate 2 and a movable plate 3 slidable on cylindrical guides 4 which are supported by the frame 9 of the machine and between which, in a way known in itself, may be mounted a mould (not shown).

DETAILED DESCRIPTION OF THE INVENTION

The movable plate 3 is actuated by a fluid operated cylinder, indicated generally with reference numeral 5, through a kinematic toggle mechanism indicated generally with reference numeral 6; in the case of the embodiment shown, said kinematic mechanism consists substantially of two units, each of which comprises a crank 7 hinged by means of a pivot 8 on the frame 9 and a pair of connection rods 12 and 13, one end of which being hinged on a pivot 14 of the crank 7 while the other ends are hinged on a movable frame 15 and on the movable plate 3, respectively.

The movable frame 15 is fixed to one end of a stem 16 rigidly connected to a piston 17 of the fluid operated cylinder 5. This cylinder comprises also a casing 18 which has slidably mounted therein the piston 17 and is fixed to the frame 9 of the machine. The piston, mounted on the end of the stem 16, for example by means of a pair of threaded rings 17a defines, inside the casing 18, a pair of anular chambers 19 and 20, into each of which can be fed a pressurized fluid which is apt to cause the piston 17 to move in a prefixed direction, and from each of which said fluid can be discharged.

Figure 1:
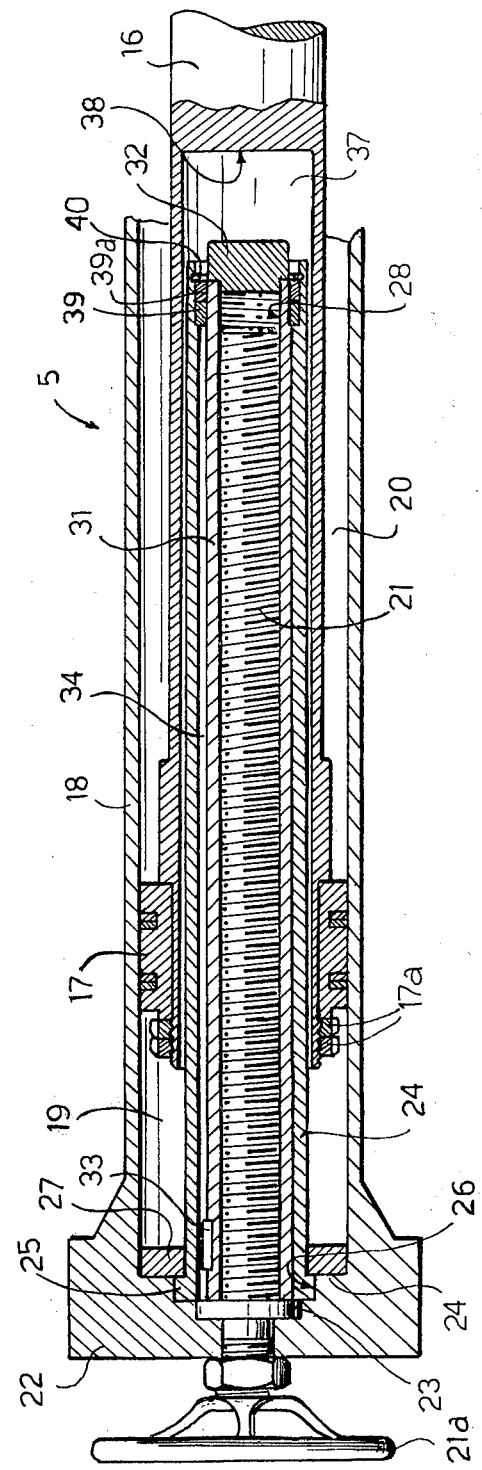
FIG. 1 shows a longitudinal section of the device according to the invention.

Mounted on a machine of the specified type, known in itself, is a device according to the invention, shown in FIG. 1, which device comprises substantially a threaded stem 21, stationary axially and rotatable relative to an end wall 22 of the casing 18. To this end, the stem 21 is suitably provided with an end collar 23 mounted rotatably in a correspondent cylindrical recess of the wall 22; a sleeve 24 is provided with an annular end projection 25 which is lodged in a correspondent cylindrical recess 26 of the wall 22 and is maintained rigidly fixed in it by means of a ring 27 connected to said wall for example by means of screws (not shown). The stem 21 can normally be rotated by means of a handwheel 21a rigidly connected to it.

Coupled with the threaded stem 21 is a nut 28 formed in a tubular element 31 which is provided with an end head 32 is lodged inside the sleeve 24 such as to be slidable axially with respect to it. The tubular element 31 is prevented from any rotation with respect to said sleeve, for example by means of a tab 33 disposed in a cavity of said element and slidable inside a correspondent groove of the sleeve 24. Conveniently, but not necessarily, in the end portion of the stem 16 having fixed thereon the piston 17, there is formed a cylindrical recess 37 defined by a cylindrical surface, whose dimensions are such as to allow accomodation of the sleeve 24, and by a plane bottom surface 38 which is apt to allow the abutment of the head 32 of the tubular element 31. Disposed in the end portion of the sleeve 24 are a plain bearing 39 and a sealing element 39a which are accomodated in a correspondent seat of said sleeve and are held in it, for example, by means of a resilient ring 40. The bearing 39 is apt to support the tubular element 31, while the sealing element 39a is apt to prevent the operating fluid of the fluid operated cylinder 5 from penetrating between the tubular element 31 and the sleeve 24.

The operation of the device described above takes place as follows.

Let us suppose that a pressurized fluid is fed into the interior of the chamber 19 of the fluid operated cylinder 5 and that other fluid is discharged from the chamber 20 of said cylinder, thereby causing the piston 17 to move towards the right hand side as seen in the Figures. It follows that both the stem 16 and the movable frame 15 (FIG. 3) are displaced in the same direction and, supposing to start from the position in which the moulding press is shown in FIG. 3, the frame 15, by exerting a thrust on the connection rods 12, produces the rotation of the cranks 7 which control the rotation and translation of the connecting rods 13 to cause the kinematic toggle device 6 to assume its completely extended condition shown in FIG. 2. In such condition, the connecting rods 13 and the cranks 7 are substantially aligned and therefore constitute chains of support bars which are apt to support the high forces which act on the movable plate 3 when the moulding press is closed. Thus, the movable plate 3 assumes a position, hereinafter called first position, in which it is situated closer to the stationary plate (2), and the mould, disposed between said two plates, is closed; obviously, this position can be varied only by modifying the length of the various parts which constitute the toggles 6 (connecting rods 13 or cranks 7).

Suppose now that, starting from said first position of the movable plate 3, the latter has to be moved to a second position through a prefixed travel beginning from the precedent position. To obtain this it is sufficient to set such prefixed travel on the device according to the invention, by turning the handwheel 21a which produces the rotation of the threaded stem 21 and, consequently, the axial displacement of the tubular element 31 with respect to the stem, such as to bring the end head 32 to a pre-established position. In fact, during the rotation of the handwheel 21a, the threaded stem 21 being prevented from moving in an axial direction, the tubular element 31 will be forced to move in said direction with respect to the stem because of the threaded coupling between the stem and the nut screw 28, while the tab 33 slides in the interior of the correspondent groove 34 of the sleeve 24. During the relative axial movement of the tubular element 31 with respect to the sleeve 24, the tubular element 31 is supported by the sleeve 24 by means of the plain bearing 39, while the fluid contained in the chamber 19 is prevented from entering the anular space situated between the tubular element 31 and the sleeve 24, by means of the sealing element 39a.

Supposing to have set, by the operation described in the foregoing, a prefixed travel for the movable plate 3, if pressurized fluid is now fed into chamber 20 of the cylinder 5 and fluid is discharged from the other chamber 19, the piston is caused to move to the left as seen in the Figures. During the last part of the travel of the piston, the sleeve 24 and the other members of the device enter partially into the interior of the cavity 37, as shown in FIG. 1, until the surface 38 of said cavity stops against the head 32 of the tubular element 31. In this way, the stem 16 is stopped in a pre-established position to which corresponds said position of end of travel of the movable plate 3.

It is obvious, therefore, that by displacing axially, in the way illustrated in the foregoing, the head 32 with respect to the casing 18 of flowdynamical cylinder 5, different positions of end of travel of the movable plate 3 are obtained, and consequently it is possible to obtain different travels of the movable plate.

It is obvious from the foregoing that the travel of the movable plate 3 can be set by means of the device according to the invention in a very simple and quick way, inasmuch as it is necessary only to act manually on the handwheel 21a Furthermore, the position obtained is maintained with precision during each subsequent cycle of operation of the moulding press, without requiring further interventions of the operator or successive adjustments. Finally, the stop obtainable with the device according to the invention is of the so-called positive type, that is to say that even under the action of high axial forces exerted on the movable plate 3, the above mentioned position of end of travel is absolutely not subject to any variation; obviously, this depends upon the fact that when the head 32 of the tubular element 31 comes into contact with the surface 38 of the cavity 37, said head is apt to support high axial loads.

Furthermore, in contrast with other known stop devices, the device according to the invention does not cause any increase of the axial dimension of the machine in which it is installed; in fact, the device according to the invention is accomodated completely inside the casing of the flowdynamical cylinder.

What we claim is:

1. A device for adjusting the opening travel of a mould holder unit of a machine for moulding plastic materials, comprising:
    a movable plate which is arranged to support a portion of the mould, said plate being movable, during the opening travel, from a first position, in which said mould is closed, to a second position in which said mould is opened;
    a cylinder comprising a piston movable in a casing and apt to actuate said movable plate;
    a stop member mounted in said casing to act as a stop for said piston during said opening travel, the position of the stop member being variable by displacing the stop member axially with respect to the casing;
    a threaded stem mounted to rotate within the casing and fixed against axial movement with respect to said casing;
    a screw nut connected to said stop member and in threaded engagement with the stem;
    means arranged to prevent said screw nut from rotating with respect to said casing, so that in consequence of the rotation of said threaded stem only axial translation of said screw nut, and said stop member connected thereto, takes place;
    supporting and sealing means for said stop member, said supporting and sealing means including a tubular element which is provided with seats for supporting said stop member and with sealing elements for preventing said fluid from penetrating between said movable member and said tubular element; and
    said casing of the cylinder including an end wall, and said threaded stem and said tubular element are provided with an annular end protuberance, the casing having formed therein a cavity in which the annular protuberance of said threaded stem is rotatable and a cavity in which the annular protuberance of said tubular element is fixed.

2. A device according to claim 1, wherein said annular protuberance of said tubular element is fixed in the respective cavity of the end wall of the casing by means of a ring.

3. The device according to claim 1, wherein said piston of the cylinder has rigidly connected thereto an actuating stem, and in the end portion of said stem, in proximity to the piston, is a cylindrical cavity which is apt to receive said tubular element and is provided with a bottom wall which is apt to cooperate with said stop member in order to stop it during said opening travel.

* * * * *